(12) United States Patent
Frost et al.

(10) Patent No.: US 11,492,050 B2
(45) Date of Patent: Nov. 8, 2022

(54) MOTOR VEHICLE COMPONENT

(71) Applicant: BENTELER AUTOMOBILTECHNIK GMBH, Paderborn (DE)

(72) Inventors: Georg Frost, Steinheim (DE); Martin Schroeter, Paderborn (DE)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 0 days.

(21) Appl. No.: 17/236,133

(22) Filed: Apr. 21, 2021

(65) Prior Publication Data
US 2021/0323614 A1    Oct. 21, 2021

(30) Foreign Application Priority Data

Apr. 21, 2020  (DE) .................. 20 2020 105 963.7
Oct. 20, 2020  (EP) .................................. 20204486

(51) Int. Cl.
  *B62D 29/00*   (2006.01)
  *B62D 25/04*   (2006.01)
  *B62D 21/15*   (2006.01)

(52) U.S. Cl.
  CPC ........... *B62D 29/007* (2013.01); *B62D 21/15* (2013.01); *B62D 25/04* (2013.01)

(58) Field of Classification Search
  CPC ........ B62D 25/04; B62D 25/06; B62D 25/08; B62D 25/025; B62D 25/20; B62D 25/2018; B62D 25/2047; B62D 25/2054; B62D 21/15; B62D 21/152; B62D 21/157; B62D 29/007

USPC ........... 296/187.01, 193.06, 203.01, 203.02, 296/203.03, 209, 193.07, 204; 293/102, 293/133
See application file for complete search history.

(56) References Cited

U.S. PATENT DOCUMENTS

| 6,820,924 B2 | 11/2004 | Caliskan et al. |
| 10,293,857 B2 | 5/2019 | Kamada et al. |

(Continued)

FOREIGN PATENT DOCUMENTS

| DE | 102011011320 A1 | 12/2011 |
| DE | 102017008204 A1 | 3/2018 |

(Continued)

OTHER PUBLICATIONS

Extended European Search Report for European Application No. 20204486.3 dated Mar. 10, 2021; 10pp.

(Continued)

*Primary Examiner* — Dennis H Pedder
(74) *Attorney, Agent, or Firm* — Hauptman Ham, LLP

(57) ABSTRACT

The invention relates to a motor vehicle component 1, in particular a B pillar and similar shaped components. The motor vehicle component 1 has a shaped, in particular hot-formed or cold-formed, base member 2 of sheet steel. The base member 2 has a surface portion 3 which is provided with holes 7. According to the invention, the surface portion 3 has a tensile strength Rm greater than or equal to (≥) 1250 MPa. A hole pattern 6 which comprises at least three holes 7 forms a deformation influence zone 8 in the surface portion 3. The surface portion of the holes 7 in the surface portion 3 is between 7% and 60% and the holes 7 have a diameter d of up to 30p mm.

20 Claims, 13 Drawing Sheets

(56) References Cited

U.S. PATENT DOCUMENTS

| | | | |
|---|---|---|---|
| 2002/0069945 A1 | 6/2002 | Streubel et al. | |
| 2002/0104591 A1 | 8/2002 | Gehringhoff et al. | |
| 2011/0011499 A1* | 1/2011 | Lengauer | C21D 1/42 |
| | | | 148/567 |
| 2011/0248525 A1 | 10/2011 | Lundstroem | |
| 2018/0065670 A1* | 3/2018 | Yamada | B62D 25/2027 |
| 2019/0168813 A1 | 6/2019 | Nakamoto et al. | |
| 2020/0094524 A1* | 3/2020 | Etzlstorfer | B32B 15/011 |

FOREIGN PATENT DOCUMENTS

| | | | |
|---|---|---|---|
| EP | 1052295 A2 | 11/2000 | |
| EP | 1070656 A2 * | 1/2001 | B62D 21/15 |
| EP | 1180470 A1 | 2/2002 | |
| EP | 2185735 A1 | 5/2010 | |
| WO | 2020017645 A1 | 1/2020 | |
| WO | 2020017647 A1 | 1/2020 | |

OTHER PUBLICATIONS

European Office Action for Application No. 20204486.3 filed May 11, 2022; 10pp.

* cited by examiner

MOTOR VEHICLE COMPONENT

RELATED APPLICATIONS

The present application claims priority to European Application Number 20 204 486.3 filed Oct. 20, 2020 and German Application Number 202020105963.7 filed Apr. 21, 2020, the disclosures of which are hereby incorporated by reference herein in their entirety.

The invention relates to a motor vehicle component according to the features in the preamble of claim 1.

Motor vehicle components of the type according to the invention are in particular body or structural components of motor vehicles, such as A, B or C pillars, sill panels, bumper crossbeams or side impact bars and similar crash-relevant shaped components. The motor vehicle components have a base member which is formed from a steel sheet. The base member is hot-formed and form-hardened or comprises a cold-formed steel sheet. Such motor vehicle components are subjected to extremely high requirements with regard to their strength so that, for the production thereof, high-strength, higher-strength and super-high-strength steels are used, in particular manganese/boron steels. In this context, form-hardening belongs to the prior art. Form-hardening is a method for hot-forming steel sheets, which is also referred to as press-hardening. In form-hardening, a steel sheet of a manganese/boron/steel alloy is heated to a temperature above the specific austenitization temperature of the material, placed in a pressing tool and hot-formed to form the shaped component, wherein it cools during the shaping. In a state clamped in the pressing tool, the shaped components are hardened by means of the cooling. Such shaped components are characterized by their high strength values. In particular with shaped components of manganese/boron/steel sheets, strengths of over 1200 MPa, in particular in the range from 1300 MPa up to 2000 MPa, can be achieved by means of form-hardening.

However, the motor vehicle components of the type in question should also ensure a good crash performance with a high level of rigidity. In this context, it is desirable to configure and construct such motor vehicle components in a manner complying with the loading.

As a result of the European Patent EP 1 052 295 B1, a method for producing structural components in the automotive industry belongs to the prior art, wherein the structural components are at least in regions intended to have a high level of strength and a minimum ductility of from 5% to 10%.

EP 2 185 735 B1 relates to a method for producing hardened profile components and discloses a hardened profile component, which is formed over the cross-section with hardness gradients. In order to adjust the hardness gradients over the cross-section of the component, free edges are arranged, wherein the size, type and extent of the edges are arranged so as to be adapted to a desired degree of hardness and/or hardness gradients. The edges may be formed by means of recesses in the form of holes.

EP 1 180 470 B1 relates to a B pillar which has a soft lower portion and which promotes a controlled type of deformation.

U.S. Pat. No. 6,820,924 B2 discloses a B pillar which has in the lower region two narrow soft bands, so-called crash triggers.

In the context of DE 10 2011 011 320 A1, a vehicle body component belongs to the prior art. This component comprises at least a first and a second structural element which are connected to each other by means of a panel element, wherein the panel element is at least partially transparent and comprises a perforated structure or is a perforated metal sheet. However, this embodiment is carried out with the objective of improving the field of vision of the vehicle driver.

Based on the prior art, an object of the invention is to provide a motor vehicle component which is functionally improved for the load and which has a higher absorption capacity for kinetic energy with reduction of tensile stress loads.

This objective is achieved according to the invention with a motor vehicle component according to claim 1.

Advantageous embodiments and developments of the motor vehicle component according to the invention are set out in the dependent claims.

The motor vehicle component has a form-hardened base member of a hardenable or hardened steel sheet, in particular a manganese/boron/steel sheet or cold-formed base member of a hardened steel sheet, in particular a martensitic steel. The base member has a surface portion which is provided with holes. According to the invention, the surface portion has a tensile strength Rm greater than or equal to ($\geq$) 1250 MPa. The maximum tensile strength Rm in this surface portion is 2100 MPa. There is provided in this surface portion a hole pattern which comprises at least three holes and which forms a deformation influence zone, wherein according to the invention the surface portion of the holes in the surface portion is between 7% and 60% and the holes have a diameter of up to 30 mm. The diameter range includes all diameters. In particular, the holes have diameters between 3 mm and 30 mm, preferably between 5 mm and 20 mm.

Elongate holes or oval holes are also possible. These have a maximum length of 30 mm. Otherwise, the indication of the diameter with non-round holes always refers to the smallest axial dimension.

The motor vehicle components according to the invention are in particular body or structural components of motor vehicles which have an at least regionally hot-formed and hardened base member. Additional structural components may be subsequently joined or fitted to the cold-formed or form-hardened base member. Before the form-hardening or after the shaping operation, the rigidity of the base member can be further improved locally by means of a reinforcement metal sheet or plastics material insert.

As a result of the embodiment of the motor vehicle component according to the invention, the capability thereof for receiving and converting kinetic energy is increased. This results from the larger intrusion or shape changing path which is implemented by the deformation influence zone before a critical crack or failure occurs, without the specific tensile strength or hardness having to be reduced. A significant contribution is further made to this by the reduced crack sensitivity of the shaped components or the base member, which is brought about by a division/branching of tensile stress loads at the interfaces of the hole edges resulting from the hole pattern.

The deformation influence zone formed by the hole pattern in the surface portion further leads to a compensation for or scattering of tensile stress loads by multiple branching of the part-tensile stresses in the region which comprises at least three individual holes.

Finally, a weight improvement or reduction of the motor vehicle components is also achieved by the holes themselves. It is also possible to remove webs between individual holes in the hole pattern.

A motor vehicle component according to the invention is functionally improved and has a high absorption capacity for receiving and converting kinetic energy with a reduction of tensile stress loads. This is advantageous in the event of a load, in particular in the event of a load resulting from an impact.

The hole pattern and the deformation influence zone formed by the hole pattern is configured in such a manner that forces which occur in the event of a load, in particular tensile forces, are divided at the interfaces, that is to say at the hole edges, and are branched in tensile stress paths.

The deformation influence zone increases the energy absorption capacity by means of localized increase of the extensibility, shapeability and the degrees of shape change.

Furthermore, a growth in cracks is limited or the expansion of cracks is controlled, whereby an increase of the deformation capacity as a result of localized reduction of the tensile stresses results. This is brought about by means of cooperation of the holes of the hole pattern in the deformation influence zone which act as relief zones.

The embodiment according to the invention further enables motor vehicle components to be configured in such a manner that a change of rigidity over the longitudinal and/or transverse extent thereof is possible in an abrupt or stepped manner and with motor vehicle components with form-hardened base members comprising a steel sheet of uniform thickness and uniform strength progression.

Furthermore, as a result of the deformation influence zones, desired buckling locations may be formed in the motor vehicle component. The deformation influence zones may bring about a selective or staggered collapse of the component. This is carried out by means of localized reduction of the buckling resistance or by means of partial weakening of the resistance torque via the deformation influence zones and the configuration and arrangement thereof. The hole pattern is configured in a manner appropriate for the component and function. It is, for example, possible to arrange large holes which are arranged relatively close to each other in a line, thus in a single-line arrangement.

In an embodiment of a motor vehicle component according to the invention which is particularly advantageous in practice, the surface portion of the holes in the surface portion which has a tensile strength Rm greater than or equal to ($\geq$) 1250 MPa and which is provided with the hole pattern is between 20% and 60%.

An aspect of the invention makes provision for the holes to be in particular round, oval or elliptical. Rounded holes without any angled transitions are preferred. A notch effect can thereby be prevented. The holes have a diameter between greater than or equal to ($\geq$) 5 mm and less than or equal to ($\leq$) 30 mm, in particular less than or equal to ($\leq$) 20 mm. The indication of the diameter relates in each case to the longitudinal axis of a hole or the main axis of a hole. The holes can be readily punched.

Within a hole pattern, holes with different diameters may also be combined in the diameter range predetermined according to the invention. The hole pattern then has at least two holes with diameters which are different from each other.

In practice, hole diameters between 5 and 18 mm or 6 and 14 mm are possible and efficient.

The holes may also have adaptations on the hole edge, in particular collar-like adaptations. The holes are then formed as so-called eyelets. An edge-side collar on a hole may be configured in a peripheral or interrupted manner. In particular, the collars are formed on the holes when the holes are produced.

In an advantageous embodiment, two adjacent holes are arranged with spacing from each other, wherein the spacing of the holes is sized to be less than or equal to ($\leq$) the hole diameter. This spacing is measured from the hole edge of one of the holes to the adjacent hole edge of the adjacent hole. The spacing between the hole edges of adjacent holes may also be referred to as the web width.

An advantageous alternative makes provision for the web width, that is to say the spacing between two adjacent holes, to be from 5 mm up to 2.5 times the diameter of the holes or the largest hole width.

A practical embodiment makes provision in this context for two adjacent holes to be arranged with a spacing of between 4.0 mm and 50.0 mm inclusive in each case. This embodiment has a good punching quality in a press stroke.

Furthermore, in a motor vehicle component, a deformation influence zone may be formed by a hole pattern in which a number of holes have a different spacing with respect to each other. A first hole and a second hole adjacent to the first hole have a first spacing. The second hole and a third hole adjacent to the second hole have a second spacing relative to each other. The first spacing between the first hole and the second hole and the second spacing between the second hole and the third hole have different sizes from each other.

As a result of a variation of holes with different diameters and holes which are arranged relative to each other with different spacings, the absorption capacity for kinetic energy can be adjusted in a selective manner with reduction of tensile stress loads in the motor vehicle component. The deformation influence zone brings about a correct deformation or shaping behavior which is adapted to the respective motor vehicle component.

The deformation influence zone is adapted to the force introduction direction which may be anticipated in the event of a crash.

The surface portion of the base member has a portion length which is sized in the direction of the main axis or extent axis of the base member. The base member has, when measured over the main axis thereof, an overall length. An advantageous aspect of this invention makes provision for the ratio of the portion length of the surface portion to the overall length of the base member to be between 1 and 35 to 100 (1:100 to 35:100). In other words, the base member or the vehicle component has in the majority of the surface thereof no perforated surface portions with a hole pattern. Of course, in the context of the invention other functional openings are possible.

Another advantageous embodiment of the invention makes provision for a hole pattern which is formed by at least two hole rows which are vertically and/or horizontally spaced apart from each other. In a particularly advantageous manner, the holes of the hole rows are arranged so as to be vertically and/or horizontally offset from each other. Individual hole rows may extend in a linear or curved manner. In particular, the hole perforations and the hole rows or the hole pattern are adapted to the three-dimensional contour extent of the base member in the surface portion and the embodiment of the deformation influence zone.

As an alternative to the arrangement of a plurality of hole rows, an irregular distribution of the holes without a row association may also be advantageous, in particular in order to prevent or inhibit cracks in the event of a crash-related deformation.

A particularly advantageous embodiment comprises a hole pattern which surrounds a non-perforated region of the surface portion.

According to the invention a deformation influence zone is configured and arranged in such a manner in the surface portion with respect to a trimming edge that a growth in cracks is counteracted. In particular, a growth or expansion of cracks which occur in the event of an impact is minimized or in any case limited. The deformation influence zone is arranged in such a manner that it limits a crack growth. In this context, the deformation zone is arranged with spacing from a trimming edge and has a zone spacing with respect to the trimming edge which corresponds at least to the diameter of the smallest hole in a deformation influence zone. The base member preferably comprises a homogeneous steel sheet of uniform thickness or material. As a result of the invention, the use of tailored blanks, in particular tailored rolled or tailored welded blanks, can be dispensed with.

In the context of the invention, a base member may also have a plurality of, in particular two, surface portions with a tensile strength Rm greater than or equal to 1250 MPa and in each case a deformation influence zone which is provided therein.

As a result of the arrangement of two surface portions which are located with spacing from each other and in which a deformation influence zone is provided in each case, a four-point bending mode which is advantageous for the deformation behavior is produced. A bending of the motor vehicle component, for example of a longitudinal carrier, a side sill panel or also a bumper crossbeam, is carried out by this embodiment in an eccentric manner. The deformation behavior and the energy absorption capacity is improved, the absolute bending path is shorter.

The perforated deformation influence zones which are provided according to the invention locally reduce the thrust transmission during bending. The axial stability is hardly changed. The embodiment is particularly advantageous in motor vehicle components which are axially, but also radially loaded.

The invention relates in particular to motor vehicle components, such as A, B or C pillars, sill panels, bumper crossbeams, lateral and/or door structure supports and roof frames, longitudinal carriers, tunnel-like members and also transverse links.

In a B pillar, the deformation influence zone is preferably located in the lower third of the length of the B pillar, in particular above an expanded pillar base.

Preferably, the base member of the motor vehicle components has a longitudinal portion which has a substantially U-shaped or V-shaped cross-section having a base web and two members, wherein flanges adjoin the members at the end side. The longitudinal portion preferably extends over the majority of the length of the base member.

In the context of the invention, there is preferably provision for at least one hole pattern to be provided in at least one member of the base member or the longitudinal portion of the base member which has the U-shaped or V-shaped cross-section.

Alternatively or additionally, a hole pattern may be provided in the region of the transition from the base web of the longitudinal portion to a member. The transition itself may be configured in a rounded manner or be constructed as a bending or buckling edge. The hole pattern is provided directly in the transition line or bending or buckling line. The hole pattern may also comprise a portion to the left and right of the transition line or bending or buckling line.

Alternatively or additionally, a hole pattern may be provided in the base web of the longitudinal portion.

Again alternatively or additionally, a hole pattern may also be provided in at least one flange of the longitudinal portion of the base member which is configured in a U-shaped or V-shaped manner.

In a longitudinal carrier, deformation influence zones may be provided in a state distributed over the length of the carrier. In the two end portions, the longitudinal carrier is not perforated or the longitudinal carrier has at that location no deformation influence zones. The length of the end portions is sized to be approximately 300 mm if the longitudinal carrier or the motor vehicle component has an overall length of more than 1000 mm. In the central longitudinal portion of the motor vehicle component located between the end portions, deformation influence zones are provided in a state distributed with spacing from each other. These zones have hole patterns which are formed from holes. The individual deformation influence zones may have a length of at least 200 mm. In a motor vehicle component which has a longitudinal portion and which has a substantially U-shaped or V-shaped cross-section, deformation influence zones may be provided in the members at the upper sides and lower sides of the motor vehicle component. Advantageously, the deformation influence zones are provided at the upper sides and at the lower sides to be offset relative to each other.

In an embodiment of a motor vehicle component according to the invention, the base member has a longitudinal portion which has a substantially U-shaped or V-shaped cross-section in a horizontal cross-section. The base member then has a base web with two lateral members. Flanges can adjoin said members. The longitudinal portion preferably extends over the majority of the length of the base member. As a result of the U-shaped or V-shaped cross-section, the base member has a longitudinal side which is open on one side. Said longitudinal side can be at least partially closed by a closure plate which is fixed to the free ends of the members or to the flanges.

The deformation behavior, in particular the initial introduction of a deformation in the deformation influence zone of the motor vehicle component, can be additionally improved by the combination with further desired deformation elements or can be predefined in a component-appropriate way by corresponding arrangement of desired deformation elements. The desired deformation elements introduce the deformation in the deformation influence zone in a selective manner. The deformation then continues through the larger intrusion and deformation path brought about by the hole pattern, provided according to the invention, in the deformation influence zone. Desired deformation elements may be beads or impressions. Similarly, desired deformation elements may be realized by a selective tapering of the material of the component in the deformation influence zone or adjacent to the deformation influence zone. The invention is described in greater detail below with reference to drawings, in which:

Mutually corresponding components and component parts are given the same reference numerals in FIGS. 1 to 16.

FIGS. 1 and 2 show a motor vehicle component 1 according to the invention in the form of a B pillar.

Figure 1:
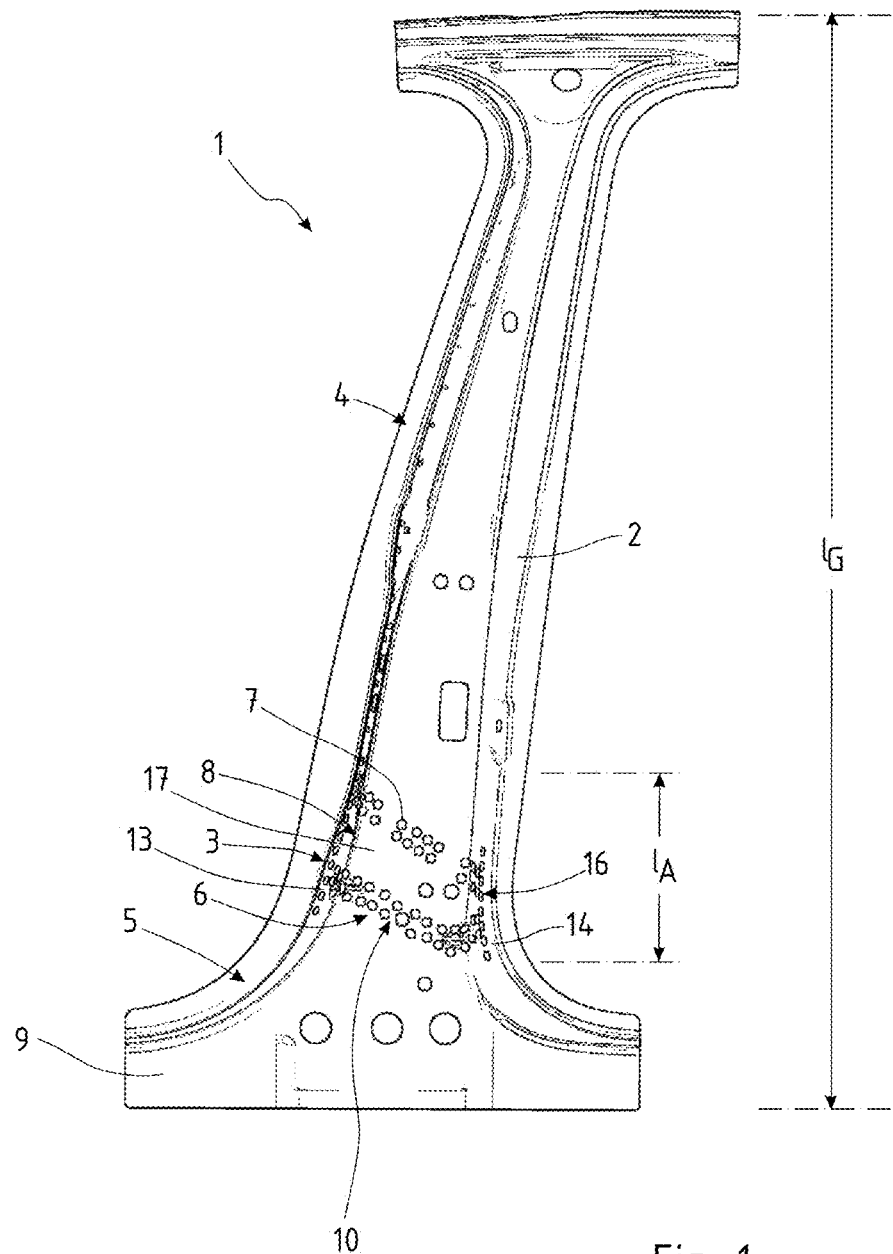
FIG. 1 is a front view of a motor vehicle component according to the invention in the form of a B pillar.

The B pillar has a form-hardened base member 2 comprising a manganese/boron/steel sheet. The base member 2 has a surface portion 3. As a result of the form-hardening, this surface portion 3 has a tensile strength Rm greater than or equal to (≥) 1300 MPa. In the portions 4, 5 above and below the surface portion 3, the B pillar may have a tensile strength Rm which differs from the tensile strength of the surface portion 3. A hole pattern 6 comprising at least three holes 7 is arranged in the surface portion 3 and forms a deformation influence zone 8. The surface portion of the holes 7 in the surface portion 3 is between 30% and 60%.

The surface portion 3 with the hole pattern 6 and the deformation influence zone 8 which is formed thereby are arranged in the lower third of the B pillar in the region above the transition to the pillar base 9.

The hole pattern 6 has in each case two hole rows 11, 12 which form a double hole strip 10. The double hole strip 10 or the hole rows 11, 12 extend in the transverse direction obliquely over almost the full width of the B pillar. In each case on the lateral members 13, 14 of the B pillar, another vertically orientated hole row 15, 16 which belongs to the hole pattern 6 is provided. The hole pattern 6 is formed by means of hole rows 11, 12, 15, 16 which are vertically and horizontally spaced apart from each other. The hole pattern 6 surrounds a non-perforated region 17 of the surface portion 3.

Figure 3:
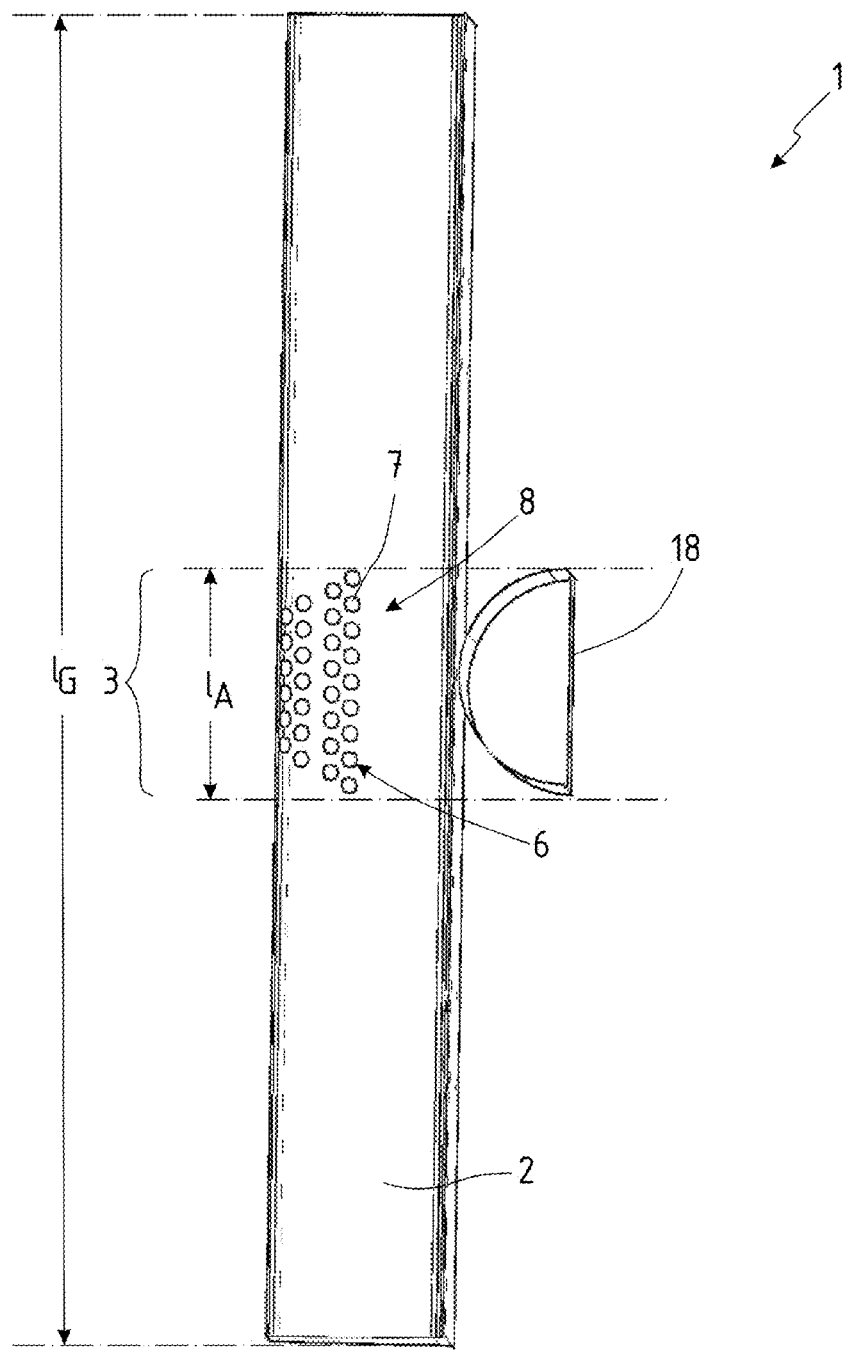
FIG. 3 shows another embodiment of a motor vehicle component according to the invention.
Figure 4:
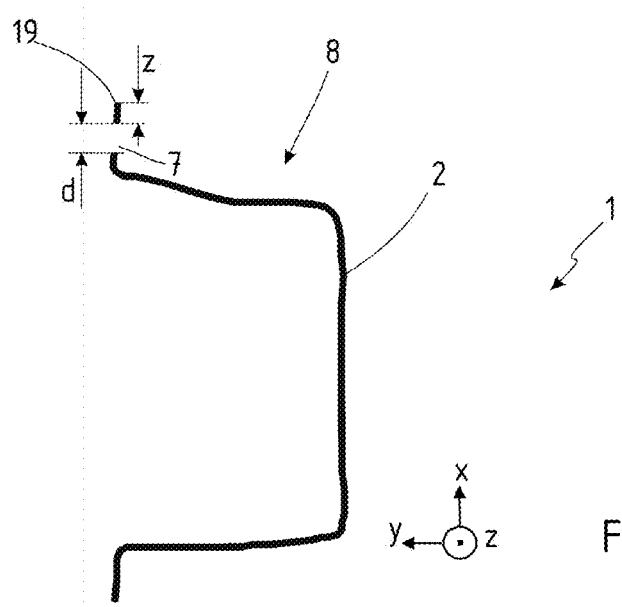
FIG. 4 is a technically schematic cross-section of the motor vehicle component.
Figure 5:
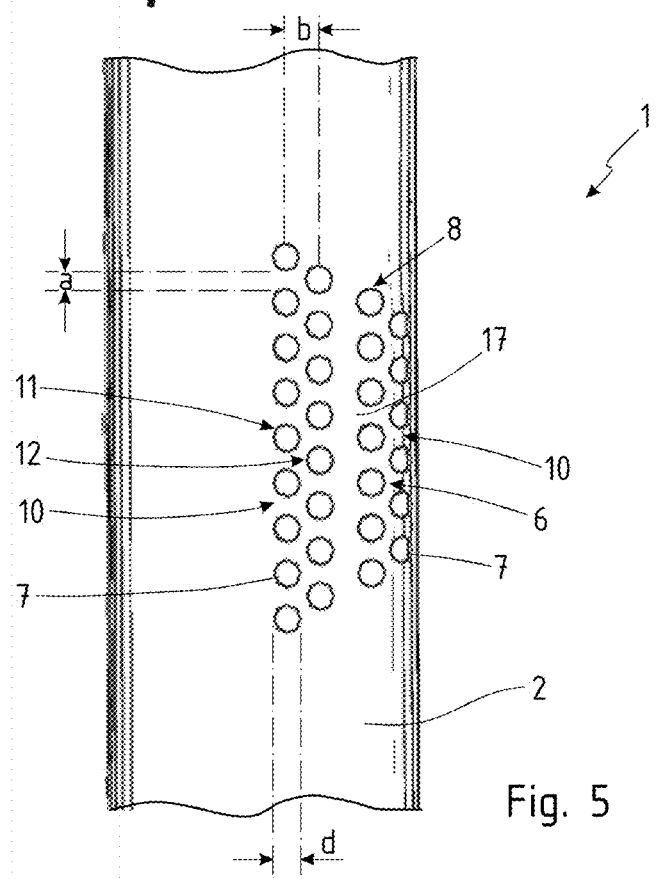
FIG. 5 is a cut-out of the motor vehicle component according to FIG. 4 in the region of the deformation influence zone.

The holes 7 have a diameter d between 5 mm and 20 mm, see in this regard FIGS. 3 to 5. The diameter d of the holes 7 within a hole pattern 6 may vary. In the B pillar or the base member 2 thereof, the holes 7 are circular with a diameter d between 7.0 mm and 10.0 mm. Two adjacent holes 7 are arranged with a spacing a from each other, wherein the spacing a may generally be between 4.0 mm and 50.0 mm. In the embodiment illustrated, the spacing a is between 4.0 mm and 20.0 mm. In a plurality of hole rows 11, 12 or 15, 16, a horizontal spacing b and a vertical spacing a is provided, wherein the spacing a and the spacing b may be identical to or different from each other. In an advantageous embodiment, the spacing b is less than or equal to twice the diameter d and greater than the diameter d. The spacing b is in this instance measured from the center of the hole to the center of the hole.

The ratio of the spacing b to the diameter d can be expressed as follows: d b 2d. The spacing b between two hole rows is greater than or equal to the diameter d, but less than or equal to twice the diameter d. This measure ensures that sufficient material is provided to dissipate energy between the holes of the two hole rows. Potential crack material and a crack path are thereby ensured.

As a result of the deformation influence zone 8 provided according to the invention, the B pillar is optimized for a load in the event of a side-on impact. The B pillar has a substantially improved capability for receiving kinetic energy. The hole pattern 6 is configured and arranged in such a manner that a selective bending resistance is adjusted and tensile stress loads as a result of the introduction of force are reduced. This occurs in particular as a result of multiple branching of the loads which occur into partial tensile stresses or paths. In addition, as a result of the perforation, a weight reduction of the motor vehicle component 1 is achieved.

FIGS. 3 to 5 show another embodiment of a motor vehicle component 1. This is in this instance a longitudinal or transverse carrier or a sill panel. The configuration is carried out in a similar manner to the motor vehicle component 1 described with reference to FIGS. 1 and 2. Consequently, the reference numerals are used accordingly. The motor vehicle component 1 has a form-hardened base member 2 of sheet steel. The base member 2 has a surface portion 3 which is provided with holes, wherein the surface portion 3 has a tensile strength Rm greater than or equal to (≥) 1250 MPa, in particular 1300 MPa. The hole pattern 6 formed by the holes 7 forms in the surface portion 3 a deformation influence zone 8, wherein the surface portion of the holes in the surface portion 3 is between 20%, in particular 30% and 60%.

An impact obstacle is designated 18 in FIG. 3.

Figure 2:
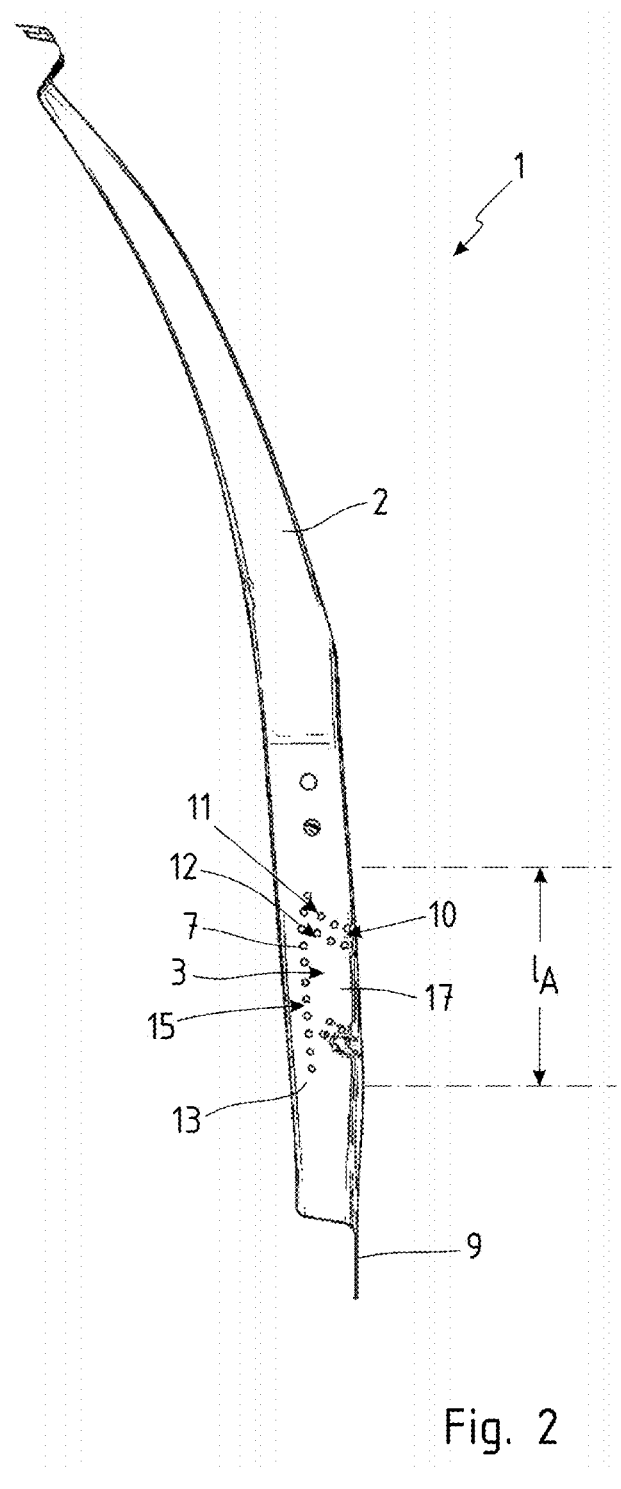
FIG. 2 is a side view of the B pillar.

The surface portion 3 in the base members 2 of the motor vehicle components 1 according to the illustrations of FIGS. 1 and 2 or 3 has a portion length IA. The base member 2 has an overall length IG. The ratio of the portion length IA to the overall length IG is between 1:100 to 35:100, in particular the ratio is approximately 30:100.

In the motor vehicle component 1 illustrated in FIGS. 3 to 5, the hole pattern 6 is formed from at least two hole rows 11, 12 which are vertically and/or horizontally spaced apart from each other. The holes 7 in the hole rows 11, 12 are each arranged to be offset with respect to each other. It may be advantageous to provide a maximum of two hole rows in order to prevent long cracks between the hole rows or holes. Preferably, the horizontal spacing b is less than 30 mm.

FIG. 4 is intended to be understood to be technically schematic and not to scale. FIG. 4 serves to explain the arrangement of a deformation influence zone 8 in relation to a trimming edge 19 of a base member 2. The deformation influence zone 8 has with respect to the trimming edge 19 a zone spacing z which corresponds at least to the diameter d of the smallest hole 7 in the deformation influence zone 8.

Figure 6:
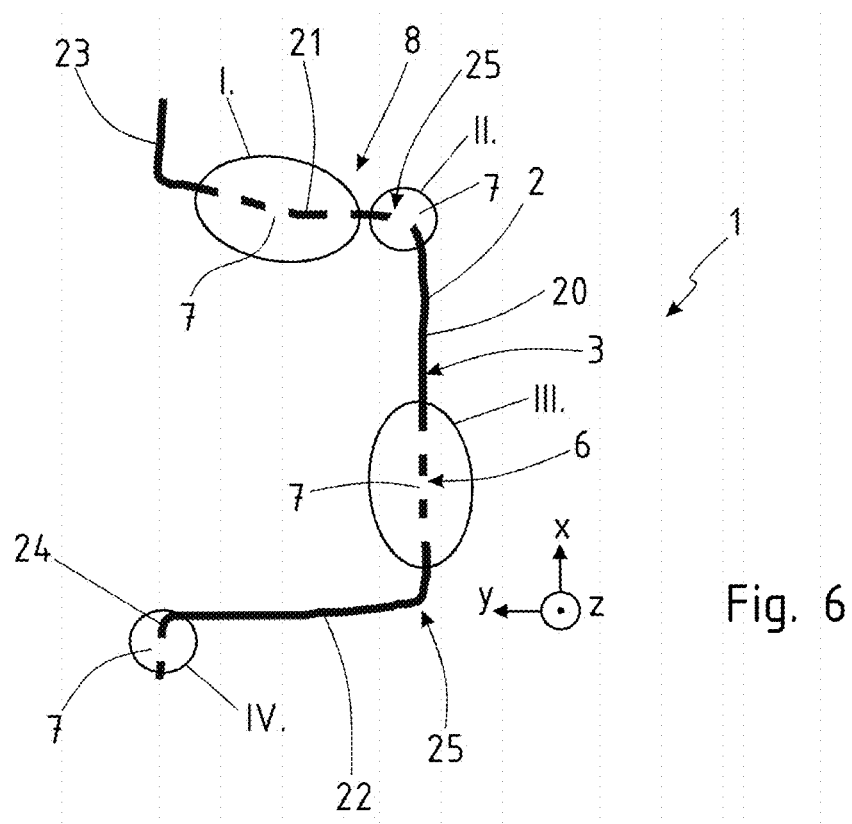
FIG. 6 is a technically schematic cross-section through a motor vehicle component with the illustration of component portions in which a deformation influence zone may be provided.

FIG. 6 is a cross-section of a motor vehicle component 1. The base member 2 of the motor vehicle component 1 has a longitudinal portion which has a substantially U-shaped cross-section. The longitudinal portion with a U-shaped cross-section has a base web 20 and two members 21, 22. The members 21, 22 are adjoined at the end side by outwardly directed flanges 23, 24.

The longitudinal portion may also have a V-shaped cross-section which is not illustrated here. In this instance, the members 21, 22 merge into each other via a base web 20 which has only a short width.

FIG. 6 identifies zones I, II, III and IV, in which a deformation influence zone 8 having a hole pattern 6 formed from holes 7 may be provided.

In the respective surface portion 3 of the longitudinal portion, the motor vehicle component 1 has a tensile strength Rm greater than or equal to (≥) 1250 MPa. The holes 7 have a diameter d between 5 mm and 20 mm. The surface portion of the holes 7 in the surface portion 3 is between 7% and 60%, preferably in the range between 20% and 45%.

Preferably, a hole pattern 6 which is formed from holes 7 is provided in one or both members 21, 22. In zone I, the hole pattern 6 is illustrated in the member 21.

Alternatively or additionally, a hole pattern 6 may be provided in the region of the transition 25 from the base web 20 to a member 21, 22 in zone II.

Furthermore, a hole pattern 6 may be arranged in the base web 20 and the zone which is designated III.

Finally, alternatively or additionally, the arrangement of a hole pattern 6 in at least one flange 23, 24 is also possible. In FIG. 6, the arrangement of the hole pattern 6 in zone IV in the flange 24 is illustrated.

Figure 7:
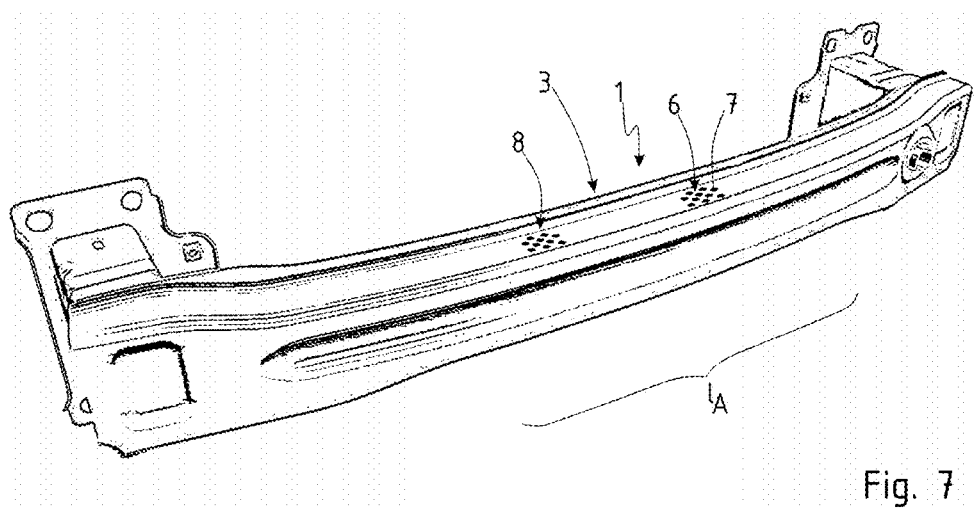
FIG. 7 is a perspective illustration of a motor vehicle component according to the invention in the form of a bumper crossbeam.

FIG. 7 shows a motor vehicle component 1 in the form of a bumper crossbeam. This crossbeam has a surface portion 3 with a tensile strength between 1250 MPa and 2100 MPa. In the central longitudinal portion of the bumper crossbeam or the motor vehicle component 1, the surface portion 3 with the portion length IA is provided. In principle, the bumper crossbeam may have over the entire length thereof a tensile strength greater than or equal to (≥) 1250 MPa. There are provided in the surface portion 3 two hole patterns 6 which are formed from an arrangement of holes 7.

Figure 8:
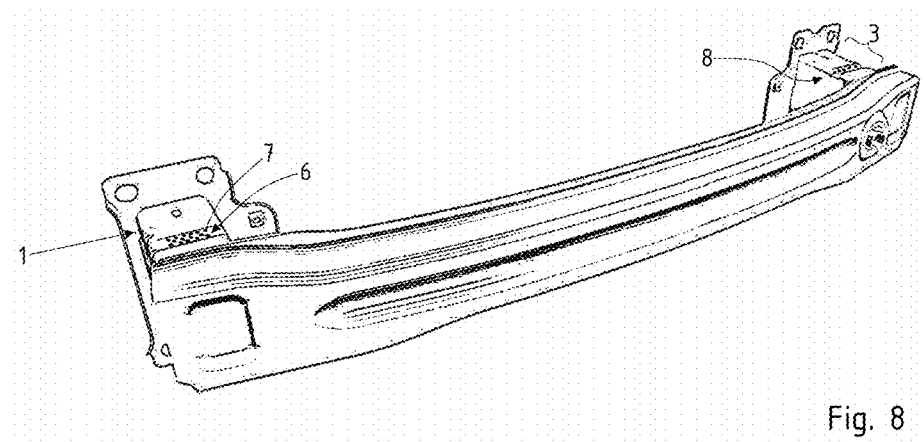
FIG. 8 is also a perspective illustration of a bumper crossbeam with motor vehicle components which are configured according to the invention in the form of crash boxes.

FIG. 8 shows a bumper crossbeam with a bumper bar and motor vehicle components 1 configured according to the invention in the form of crash boxes. In the embodiment illustrated, the hole pattern 6 which is formed from holes 7 is arranged in each case in the upper side wall of a crash box.

Figure 9:
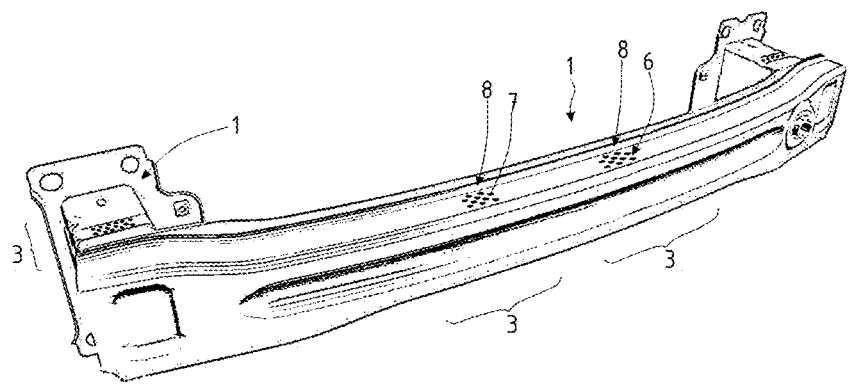
FIG. 9 is a perspective view of the bumper in which both the crash boxes and the bumper crossbeam are configured according to the invention.

FIG. 9 shows the bumper crossbeam in which the bumper bar is constructed in a similar manner to the illustration of FIG. 7 and the crash boxes are constructed in a similar manner to the illustration of FIG. 8, in each case with a deformation influence zone 8 formed from a hole pattern 6 with holes 7. FIG. 9 illustrates two surface portions 3 by way of example, which have the tensile strength provided according to the invention and which are provided with deformation influence zones 8. The respective length of the surface portions 3 may be configured to be larger than indicated in FIG. 9 and in particular extend from the center of the bumper crossbeam as far as the end region.

Figure 10:
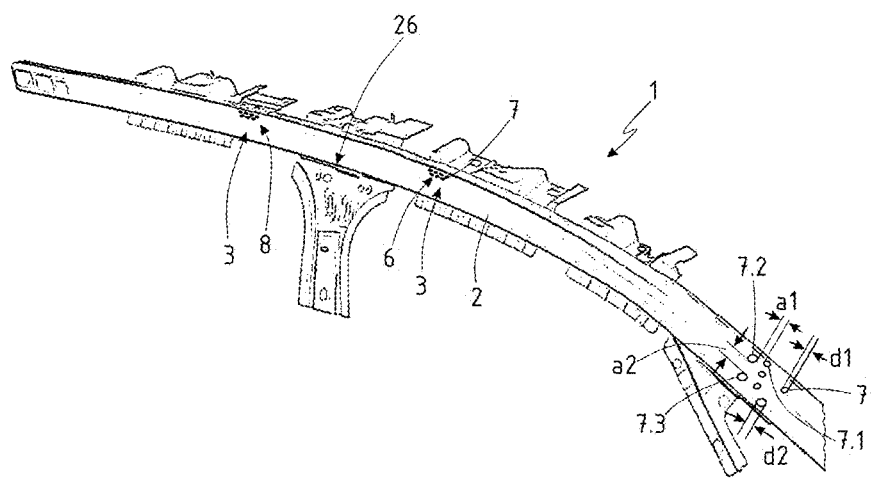
FIG. 10 is a perspective view of a motor vehicle component according to the invention in the form of a roof frame portion.

FIG. 10 shows a cut-out of a motor vehicle component 1 in the form of a roof frame. In this instance, hole patterns 6 are provided with a spacing to the left and right of the upper B pillar connection 26.

Figure 11:
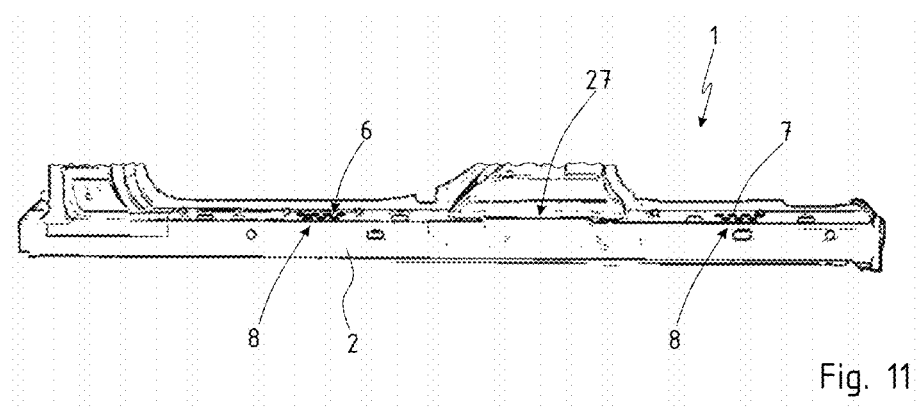
FIG. 11 shows another embodiment of a motor vehicle component according to the invention in the form of a sill panel.

FIG. 11 shows a motor vehicle component 1 in the form of a sill panel. The sill panel is configured according to the invention and has to the left and right of the lower B pillar connection 27 a hole pattern 6 formed from holes 7 which each form a deformation influence zone 8.

A motor vehicle component 1 in the form of a sill panel, as illustrated in FIG. 11, and in the form of a roof frame, as illustrated in FIG. 10, will in the event of a side-on impact or a pole crash test not buckle directly in the region of the pillar connection, that is to say the pillar which extends between the roof frame and sill panel, but instead deforms with increased energy absorption in a selective manner in or close to the two deformation influence zones 8. The maximum introduction is thereby reduced in comparison with conventional sill panels or roof frames.

Figure 12:
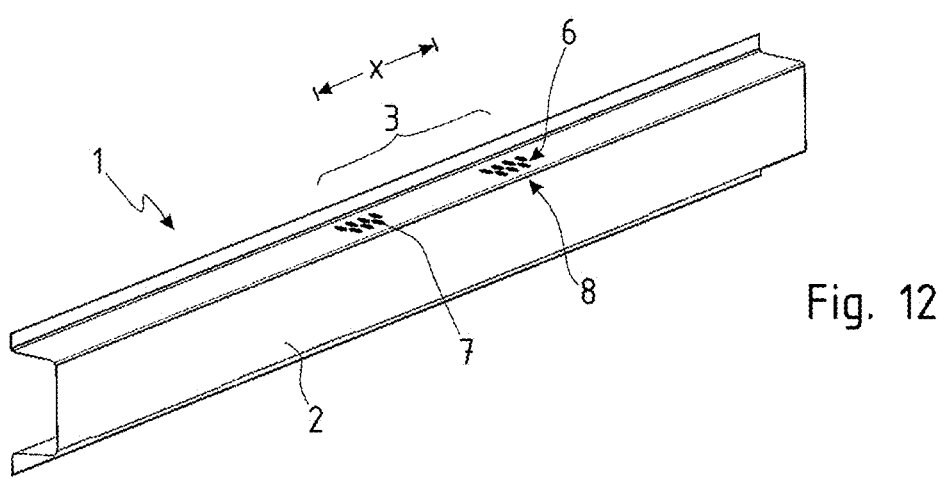
FIG. 12 shows another embodiment of a motor vehicle component according to the invention in the form of a longitudinal carrier.

A motor vehicle component 1 in the form of a longitudinal carrier is shown in FIG. 12. Deformation influence zones 8 are arranged there with spacing x in each case in the upper member 21. The longitudinal carrier may also be closed by means of a closure plate in a continuous manner or over the longitudinal portion. Such a longitudinal carrier is, for example, part of the front section or part of the rear section of a motor vehicle.

Figure 13:
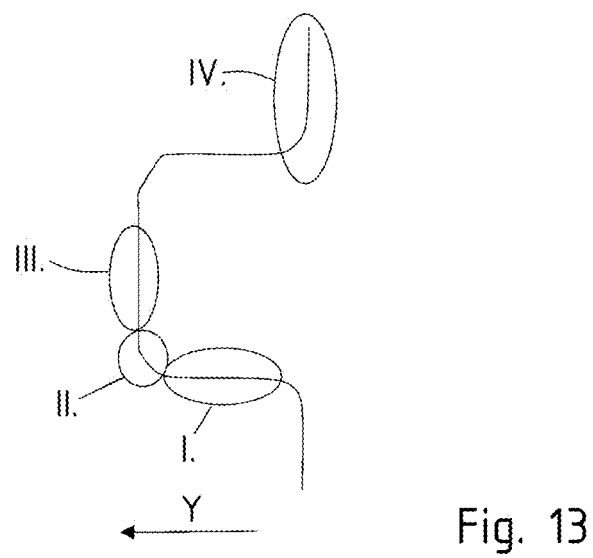
FIG. 13 is a technically schematic cross-section through the longitudinal carrier according to the illustration of FIG. 12.

FIG. 13 is a schematic cross-section through the motor vehicle component 1 of FIG. 12. Zones I, II, III, IV in which deformation influence zones 8 may be arranged are indicated.

Figure 14:
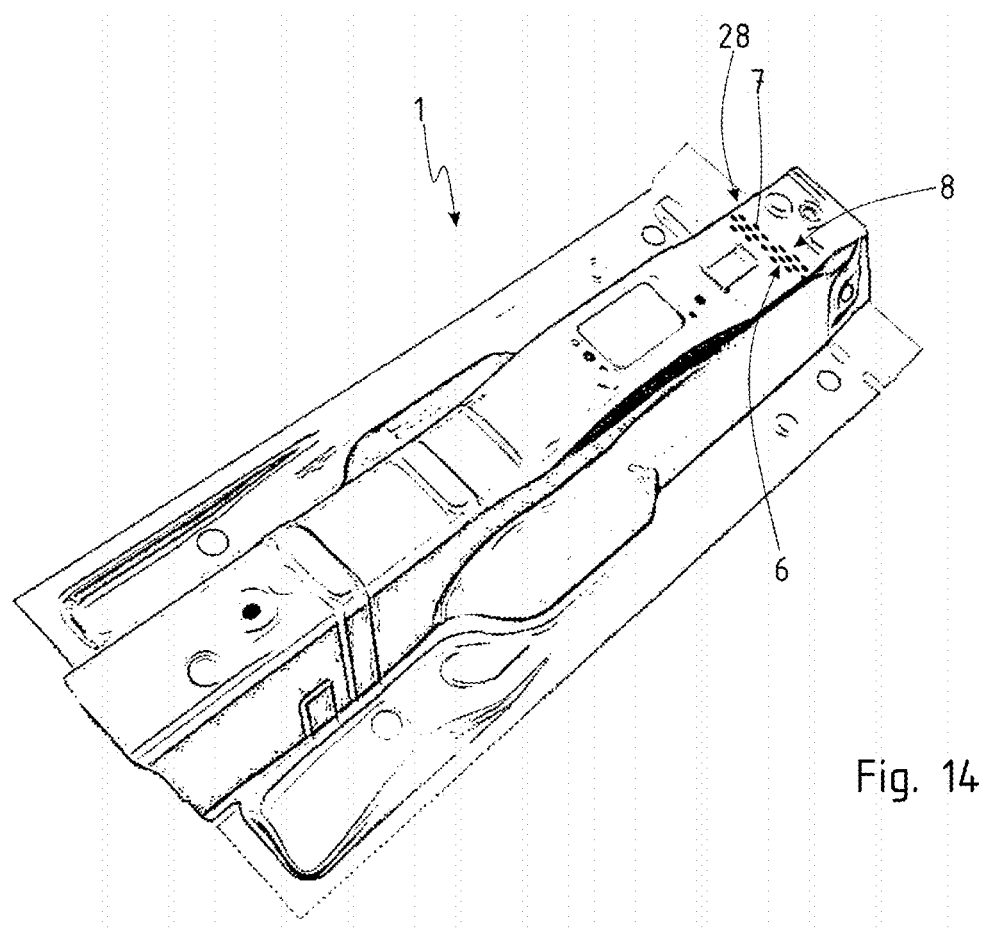
FIG. 14 is a perspective illustration of another embodiment of a motor vehicle component according to the invention in the form of a tunnel-like member.

A motor vehicle component 1 in the form of a central tunnel-like member is shown in FIG. 14. A deformation influence zone 8, formed by a hole pattern 6 of holes 7, is provided at that location in the region of the front portion 28 of the motor vehicle component 1 or the central tunnel-like member. In the case of axial energy absorption, for example as a result of a front-end crash, there is produced an axial compression of the central tunnel-like member and an energy uptake or absorption from a defined relatively high load peak. This is advantageously initiated and implemented or brought about by the deformation influence zone 8.

With reference to FIG. 10, it is explained that the holes 7 of a hole pattern 6 may have different diameters d1, d2 from each other. Furthermore, it is illustrated that a first hole 7.1 and a second hole 7.2 adjacent to the first hole 7.1 are arranged with a spacing a1 with respect to each other. A third hole 7.3 which is adjacent to the second hole 7.2 has a spacing a2 with respect to the second hole 7.2. The spacing a1 between the first hole 7.1 and the second hole 7.2 and the spacing a2 between the second hole 7.2 and the third hole 7.3 are sized differently. The spacing a1 is greater than the spacing a2.

Figure 15:
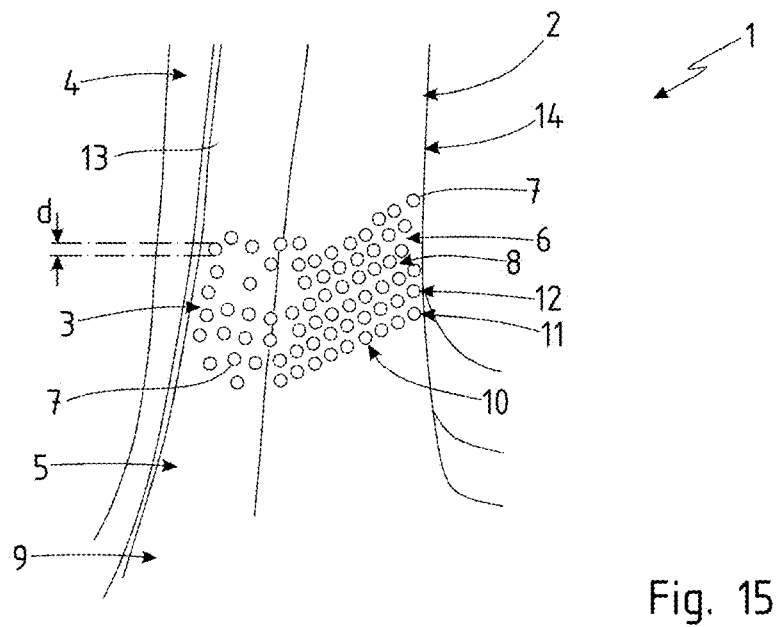
FIG. 15 is a cut-out of a motor vehicle component according to the invention in the form of a B pillar with a view of a deformation influence zone prior to a deformation and FIG. 16 is an illustration of the motor vehicle component corresponding to the illustration of FIG. 15 after a deformation of the motor vehicle component in the region of the deformation influence zone.
Figure 16:
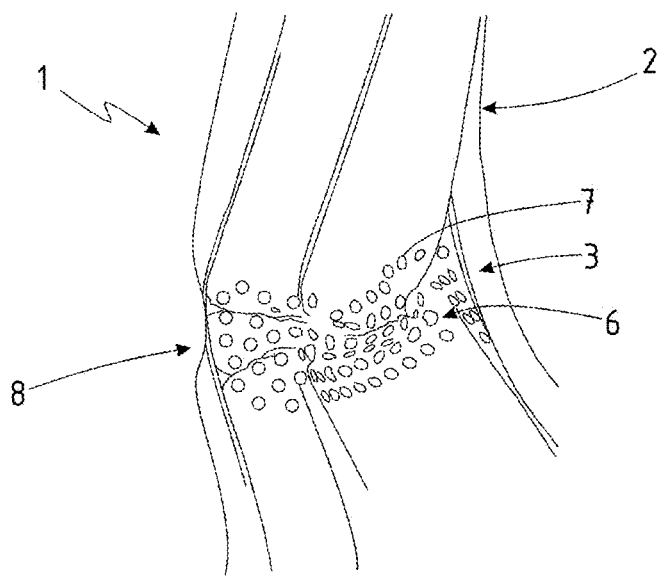

FIGS. 15 and 16 show a cut-out of a motor vehicle component 1 according to the invention in the form of a B pillar. The motor vehicle component 1 corresponds in terms of structure to the motor vehicle component 1 as illustrated in FIG. 1. It is a cut-out of a B pillar. Reference is additionally made to the corresponding explanations of FIGS. 1 and 2. FIG. 15 shows a cut-out of the motor vehicle component 1 in the customary use or delivery state. The motor vehicle component 1 and the deformation influence zone 8 integrated therein are not deformed. The deformation influence zone 8 is located between an upper pillar portion 4, in particular an upper door lock region, and a lower pillar portion 5, in particular the pillar base 9.

FIG. 16 shows the cut-out of the motor vehicle component 1 with the deformation influence zone 8 after a side-on impact in which the motor vehicle component 1 and the deformation influence zone 8 have been deformed.

The B pillar has a form-hardened base member 2 comprising a manganese/boron/steel sheet. A surface portion 3 is provided in the base member 2. As a result of the form-hardening, the surface portion 3 has a tensile strength Rm greater than or equal to (≥) 1250 MPa, preferably greater than or equal to (≥) 1300 MPa. In the upper pillar portion 4 and in the lower pillar portion 5, i.e. in the portions 4, 5 above and below the surface portion 3, the B pillar may have a tensile strength Rm which differs from the tensile strength of the surface portion 3.

The deformation influence zone 8 is formed in the surface portion 3, specifically by means of a hole pattern 6 which comprises at least three holes 7. The surface portion of the holes 7 in the surface portion 3 is between 7% and 60%. An embodiment of a B pillar which is advantageous in practice provides a deformation influence zone 8 having a of a hole pattern 6 which comprises at least three holes 7 in the surface portion 3, wherein the surface portion of the holes 7 in the surface portion 3 is between in each case 20% and 60% inclusive.

The holes 7 have a diameter d of up to 30 mm. Practical tests have shown very good energy absorption properties of the motor vehicle component in the deformation influence zone 8 when the holes 7 have diameters d between 3 mm and 30 mm, preferably between 5 mm and 20 mm.

The surface portion 3 with the hole pattern 6 and the resultantly formed deformation influence zone 8 are arranged in the lower third of the B pillar in the region above the transition to a pillar base 9.

FIG. 16 shows the motor vehicle component 1 or the B pillar after a side-on impact in which the motor vehicle component 1 has been deformed and the deformation influence zone 8 has deformed. In the deformation influence zone 8, the component is deformed. During the deformation, in particular the inward bending or buckling, the component absorbs impact energy without tearing. The deformation, in particular the buckling, is brought about by means of the hole pattern 6 in the deformation influence zone 8. In addition, the deformation behavior can be assisted by the combination with supplementary desired deformation elements or can be configured in an advantageous and particularly effective manner in combination therewith. Supplementary desired deformation elements can be formed by beads, for example longitudinal and/or transverse beads, and/or by partial inward bulges or outward bulges and also by selective taperings of material in the walls of the motor vehicle component 1. Desired deformation elements can preferably be arranged in members and/or webs and/or in the transition region from members and/or webs of the base member 2 of a motor vehicle component 1. The component ductility and the crash deformability and thus the good energy absorption properties are realized by the configuration of the hole pattern 6 in the deformation influence zone 8.

In addition, although not illustrated graphically, the B pillar can also have local reinforcement elements, for example patches, in particular what are referred to as inner patches or inner reinforcements and also outer patches or outer reinforcements. In the case of a motor vehicle component which is configured in a shell-shaped manner and is open on one side, for example a B pillar, the base member of the motor vehicle component can be additionally closed by a closure plate, at least partially over certain longitudinal portions or else as a whole by a closure plate.

The invention claimed is:

1. Motor vehicle component comprising a base member of sheet steel, wherein the base member has a surface portion with holes, wherein the surface portion has a tensile strength Rm greater than or equal to (≥) 1250 MPa and a hole pattern comprising at least three holes, the hole pattern forming a deformation influence zone in the surface portion, the surface portion of the holes in the surface portion is between 7% and 60%, the holes have a diameter (d) of up to 30 mm, the base member has at least one trimming edge, and the deformation influence zone has with respect to the trimming edge a zone spacing (z) which corresponds at least to the diameter (d) of a smallest hole of the at least three holes in the deformation influence zone.

2. Motor vehicle component according to claim 1, wherein the surface portion of the holes in the surface portion is between 20% and 60%.

3. Motor vehicle component according to claim 1, wherein the hole pattern has at least two holes with diameters (d1,d2) which are different from each other.

4. Motor vehicle component according to claim 1, wherein the hole pattern has at least two adjacent holes with a spacing (a) with respect to each other, and the spacing (a) is sized to be less than or equal to (≤) a hole diameter.

5. Motor vehicle component according to claim 1, wherein the hole pattern has at least two adjacent holes with a spacing (a) of up to 50.0 mm.

6. Motor vehicle component according to claim 1, wherein the hole pattern is formed by at least two hole rows which are vertically spaced apart from each other and extend in parallel with each other.

7. Motor vehicle component according to claim 6, wherein the holes of one hole row of the at least two hole rows are offset with respect to the holes of the other hole row.

8. Motor vehicle component according to claim 1, wherein the hole pattern surrounds a non-perforated region of the surface portion.

9. Motor vehicle component according to claim 1, wherein the surface portion comprises at least two surface portions, and each surface portion of the at least two surface portions has a hole pattern formed by holes.

10. Motor vehicle component according to claim 9, wherein in the at least two surface portions, which are axially spaced from each other, are mutually different hole patterns.

11. Motor vehicle component according to claim 1, wherein the base member is formed from a homogeneous steel sheet which is uniform in thickness or material.

12. Motor vehicle component according to claim 1, wherein the base member has a longitudinal portion which has a substantially U-shaped cross-section having a base web, flanges, and two members wherein the flanges adjoin the two members at an end side of the base member.

13. Motor vehicle component according to claim 12, wherein at least one hole pattern is in at least one member.

14. Motor vehicle component according to claim 12, wherein at least one hole pattern is in a region of transition from the base web to at least one member of the two members.

15. Motor vehicle component according to claim 12, wherein at least one hole pattern is in the base web.

16. Motor vehicle component according to claim 1, wherein at least one hole pattern is in at least one flange of the base member.

17. Motor vehicle component according to claim 1, wherein a first hole and a second hole which is spaced apart from the first hole have a first spacing (a1) with respect to each other and the second hole and a third hole which is adjacent to the second hole have a second spacing (a2) with respect to each other, and the first spacing (a1) and the second spacing (a2) are sized differently.

18. Motor vehicle component according to claim 1, wherein the hole pattern is formed by at least two hole rows which are horizontally spaced apart from each other and extend in parallel with each other.

19. Motor vehicle component comprising a base member of sheet steel, wherein the base member has a surface portion with holes, wherein the surface portion has a tensile strength Rm greater than or equal to (≥) 1250 MPa and a hole pattern comprising at least three holes, the hole pattern forming a deformation influence zone in the surface portion, the surface portion of the holes in the surface portion is between 7% and 60%, the holes have a diameter (d) of up to 30 mm, wherein at least one hole pattern is in at least one flange of the base member.

20. Motor vehicle component comprising a base member of sheet steel, a base web, and two members, wherein the base member has a surface portion with holes, wherein the surface portion has a tensile strength Rm greater than or equal to (≥) 1250 MPa and a hole pattern comprising at least three holes, the hole pattern forming a deformation influence zone in the surface portion, the surface portion of the holes in the surface portion is between 7% and 60%, the holes have a diameter (d) of up to 30 mm, wherein at least one hole pattern is in at least one member, and the at least one hole pattern is in a region of transition from the base web to at least one member of the two members.

* * * * *